United States Patent [19]
Gladney

[11] Patent Number: 6,044,378
[45] Date of Patent: Mar. 28, 2000

[54] METHOD AND SYSTEM FOR A FEDERATED DIGITAL LIBRARY BY MANAGING LINKS

[75] Inventor: Henry Martin Gladney, Saratoga, Calif.

[73] Assignee: International Business Machines Corporation, Armonk, N.Y.

[21] Appl. No.: 08/939,681

[22] Filed: Sep. 29, 1997

[51] Int. Cl.[7] .................................................. G06F 17/30
[52] U.S. Cl. .................... 707/103; 707/101; 707/205; 345/302
[58] Field of Search ..................... 707/104, 205, 707/101, 103, 3, 501, 516, 200, 10, 2; 345/302, 202, 433, 356; 348/384; 380/23, 25, 30, 49; 382/180, 175; 370/229; 364/225, 222

[56] References Cited

U.S. PATENT DOCUMENTS

| | | | |
|---|---|---|---|
| 4,200,770 | 4/1980 | Hellman et al. | 380/30 |
| 5,089,956 | 2/1992 | MacPhail | 707/200 |
| 5,276,901 | 1/1994 | Howell et al. | 707/9 |
| 5,315,657 | 5/1994 | Abadi et al. | 380/25 |
| 5,335,346 | 8/1994 | Fabbio | 711/163 |
| 5,339,403 | 8/1994 | Parker | 711/221 |
| 5,649,185 | 7/1997 | Antognini et al. | 707/9 |
| 5,664,227 | 9/1997 | Mauldin et al. | 345/302 |
| 5,832,499 | 11/1998 | Gustman | 707/103 |
| 5,835,667 | 11/1998 | Wactlar et al. | 386/96 |
| 5,857,203 | 1/1999 | Kauffman et al. | 707/200 |

OTHER PUBLICATIONS

ISO/IEC 10181–3, Information Technology–Open Systems Interconnection–Security Frameworks For Open Systems: Access Control Framework (1996), pp. 1–36.

H.M. Gladney, Access Control for Large Collections, ACM Transactions on Information Systems (Apr. 1997), pp. 154–194.

H.M. Gladney, et al., External Design of a Document Storage Subsystem, IBM Research Report RJ 8267 (Aug. 1, 1991), pp. 1–153.

H.M. Gladney, A Storage Subsystems for Image and Records Management, IBM Systems Journal, vol. 32, No. 3 (1993), pp. 512–540.

S. Hitchcock et al., Citation Linking: Improving Access to OnLine Journals, Proc. 2nd ACM Int'l. Conf. on Digital Libraries, (Jul. 1997), pp. 115–122.

*Primary Examiner*—Wayne Amsbury
*Assistant Examiner*—Thu-Thao Havan
*Attorney, Agent, or Firm*—Sughrue, Mion, Zinn, Macpeak & Seas, PLLC

[57] ABSTRACT

A system and method are provided for determining a relationship between first and second data elements by using a relationship element. The first and second data elements are each protected elements being bound to first and second indices for providing referential integrity. The relationship is determined by reading the relationship element in response to a request and the second element is identified based on information read from the relationship element. The relationship element is in a different data collection than at least one of the first and second elements. This structure provides a robust and flexible means to create and maintain relationships between existing documents stored in various electronic libraries, while minimizing changes to exiting system software and requiring no change to application software. The invention also is directed to relating a data element in a protected resource with meta-data in a relationship resource, where the protected resource and relationship resource are arranged in a distributed manner.

38 Claims, 9 Drawing Sheets

METHOD AND SYSTEM FOR A FEDERATED DIGITAL LIBRARY BY MANAGING LINKS

BACKGROUND OF THE INVENTION

1. Field of the Invention

The present invention relates to a method and system for recording and managing relationships between elements of collections which may include previously stored elements. The invention further relates to a method and system for managing document descriptors and relationships of documents relative to one another.

2. Description of the Related Art

Information in many organizations is held in digital form in repositories which are not part of the same data library, the same computing systems or even the same administrative domain. This has hampered access to the information held in those separate repositories, even though the information held separately may be related. For example, an organization may have information residing in completely different data processing systems. These different data processing systems may be in place as a result of combining previous projects, or because of mergers or acquisitions of companies having different data processing systems. It is a common occurrence that valuable data resides and is used in separate and distinct libraries, computing systems or administrative domains.

A problem many such organizations face is that information held in heterogeneous data stores as discussed above, which may, in the minds of people within the organization, be related, remains unrelated at a data processing level. Hence, that information can be difficult to handle, and the full value of it unrealized since a frequent paradigm in intellectual work is to identify new relationships among prior ideas and recorded facts for exploitation towards practical or academic ends. Collected into carefully managed records which include records of the newly related ideas, such information is at the core of what it means to be a library. If the collection is held in digital format, it is known as a digital library. Until now, to create a digital library the source information has had to have been moved or copied from wherever it occurred into a specialized repository. If the information is moved, prior paths for finding the information and applying tools to manipulate it are disrupted; if the information is copied, referential integrity between the database and external copies must be maintained by users more or less manually. Either alternative imposes an annoying and sometimes tricky administrative burden.

A problem with conventional access control methods for file systems in such environments is that they fail to provide sufficient flexibility or scalability for these types of complex enterprises. For example, service organizations providing aircraft maintenance to both military and commercial customers need to administer authorization policies which differ for different customers, which must persist over decades, and which may evolve over the years. Such requirements cannot be satisfied with subsystems like IBM's program product RACF or with any of the access control mechanisms that have evolved for UNIX-like file systems.

Further, today's file systems fail to provide coordinated control for files in administratively separate file systems (such as might exist in different divisions of a company, especially after one company has acquired another), or heterogeneous file systems such as occur in projects using both mainframe and generic workstation-type (e.g., UNIX) systems.

Today, to combine information distributed in a network to model abstractions in addition to those planned when the information was created typically requires that the information representing each individual object be collected into a single digital storage subsystem if prudent integrity and security are to be enforced. This step always adds cost, frequently is inconvenient, and inevitably adds administrative complexity either for synchronizing information in otherwise independent data stores or for application program updates, or both.

A means for enabling a database to manage data stored in external operating system files, as if the data were directly stored in the database, has been proposed in U.S. patent application Ser. No. 08/449,600 filed May 24, 1995, entitled "Method and Means for Linking a Database System With a System for Filing Data" to Cabrera et al. (hereinafter referred to as "Cabrera et al."), which is incorporated by reference herein. In Cabrera et al. a file in a file system is bound to a database tuple in database. The database system acts as a centraized index for searching across enterprise-wide data that includes both enterprise data and extracted features of non-coded data, and large objects that can be distributed among several file servers. In order to accomplish this, Cabrera et al. employs a table 60, shown in FIGS. 1 and 2, in the database 16 which relates a file 19 in the file system 17 to attributes about the file held in the database table 60. One column 63 in the Cabrera et al. database table is a column for an "external file reference" (efr) data type. The efr data type contains information identifying a server (e.g., server i) that controls the file (e.g., 70 and 72). The efr data type binds the database tuple 61 to the file via the server name and file name 70. FIG. 1 shows a Cabrera et al. table in the database in which the table has an efr data type. Here, two file names 70 and 74, in file servers i and j, respectively, and their corresponding files are bound to tuples in the table. FIG. 2 shows a structure in which the table 60 and its associated database management system 15, are coupled to various file servers 17.

By providing a level of indirection, via the database, to a file in the file system, Cabrera et al. can safely bind information in file systems into object instances conforming to formal object models, and can provide referential integrity for those files. However, Cabrera et al. is limited to safely binding only files in the file systems. Organizations having heterogeneous data stores need more than just referential integrity for collections of files. They also need to provide flexible yet rigorous access control for the data elements, or targets, in the heterogeneous data stores. Furthermore, they need to support data models conducive to an enterprise system, such as information which is represented in a directed acyclical graph (dag) form. A document model, for example, is a natural model for information held in heterogeneous stores. Documents can be readily handled by a library service subsystem executable on one or more electronic digital computers, as disclosed in U.S. Pat. No. 5,649,185 to Antognini et al., which is incorporated herein by reference.

A generalized access control method for large collections is disclosed in H. M. Gladney, *Access Control For Large Collections*, ACM Transactions on Information Systems (April 1997), hereinafter "*Access Control for Large Collections*," which is incorporated herein by reference. The *Access Control for Large Collections* reference describes a robust document access control method within the limits of a single library subsystem. This access control method improves over known access control methods, as discussed in section 4.6 of *Access Control for Large Collections*. However, more is needed than this conventional access control method to support access control for information stored in the heterogenous enterprise-wide data storage environment described above, which typically span more than one library system.

SUMMARY OF THE INVENTION

The present invention is directed to solving the above problems. More spefically, an object of the present invention is to provide robust and flexible control of relationships between objects held outside a single digital library.

Another object of the present invention is to allow existing document collections to be used as if the present invention were not in place, while relating meta-data with elements in the collection designated to receive the enhanced relationship control.

Still another object of the invention is to allow existing resource managers, such as existing file systems, to be used without modification, or with very little modification, and to require no change to data stored in existing collections.

Yet another object of the invention is, generally, to provide a method and system for extending digital library services offered within a digital library to elements external to that library, such as storing relationships between those elements and providing access to those stored relationships.

Still yet another objective of the invention is to provide for a repository holding a protected element to detect that the protected is related to another protected element and to find the relationship and other attribute records, with a high degree of efficiency. The present invention provides the ability to maintain these relationships with referential integrity.

To achieve the above objects a method is disclosed of associating a first element, a second element and meta-data related to the first element, wherein the first element is a protected element and is within a first protected resource, the second element is a protected element and the meta-data is within a relationship resource, and the first and second elements are bound to first and second index elements, respectively. The method comprises identifying the relationship resource in response to a request for the meta-data; sending a message to the relationship resource for return of the meta-data; locating the meta-data in response to the message; and sending the located meta-data to the protected resource, wherein the first protected resource and the relationship resource are in a distributed arrangement, and the relationship resource indicates a relationship between the first element the second element and the meta-data.

The invention is also directed to a method of determining a relationship between a first protected element and a second protected element by using a relationship element, wherein the first and second protected elements are associated with first and second index elements, respectively. The method comprises reading the relationship element in response to a request for information related to the first protected element; and identifying the second protected element based on information read from the relationship element, wherein the relationship element is in a different data collection than at least one of the first protected element.

The invention further relates to a system for providing relationship information for a first element. The system comprises a protected resource including a data manager and the first element, wherein the first element is a protected element bound to a first index; a second element which is a protected element bound to a second index; a relationship resource including a relationship resource manager and a relationship element; and a client which sends a request to the protected resource for information related to a relationship of the first element. In response to the request from the client, the data manager identifies the relationship resource manager based on the request for relationship information and based on the first index and sends a request to the relationship resource, and in response to the request from the data manager the relationship resource manager locates the requested relationship element and retrieves the requested relationship information for the protected element based on the relationship element. The relationship information identifies the second protected element bound to a second index, and the protected resource and the relationship resource are in a distributed arrangement.

The invention further still relates to a method of creating a relationship element. The method comprises searching for a resource containing a first element having a reference to a second element; and automatically building a relationship element linking the first and second elements in response to finding the first element. The first and second elements are protected elements bound to first and second indicies, respectively, and at least one of the first and second elements is in a different data collection than the relationship element. The resource can be connected to the World-Wide Web (WWW), and the first element is an on-line document on the WWW and the reference in the first element is a citation link string identifying the second element as an on-line document on the WWW. Also, the relationship element can be a link table in a digital library, the building being performed by recording in a row of the link table an identifier for the first element, an identifier for the second element and meta-data for facilitating library services.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of an object-oriented access control method and system, and method and system for controlling relationships of elements according to the present invention, according to the present invention is described below in detail with reference to the accompanying drawings.

The object-oriented access control method and system, and method and system for managing relationships of elements, according to the present invention is described below using terms intended to conform with accepted international standards relating to access control. Specifically, the terms used herein generally conform, unless otherwise specified, with the definitions set forth in ISO 10181-3, *Information Technology-Open Systems Interconnection-Security Frameworks for Open Systems: Access Control Framework* (1996), which is incorporated herein by reference.

The inventors of the present invention have found that the burdens associated with creating digital libraries according to the conventional methods described above, can be avoided by combining the ideas and structures inherent in two prior technologies. The first is taught by Cabrera et al., in the patent application entitled "Method and Means for Linking a Database System With a System for Filing Data" (U.S. patent application Ser. No. 08/449,600 filed May 24, 1995), which describes a tool for maintaining referential integrity between a relational database and external files. The second is taught by H. M. Gladney in *A Storage Subsystem for Image and Records Management*, IBM Systems Journal 32(3), pp. 512–40 (1993), whose essentials are implemented in IBM's DIGITAL LIBRARY products. What can be achieved is that the quality and business controls inherent in a digital library can be applied to files and other persistent objects without disturbing them in any way. This is accomplished simply by adding a field to a local catalog (e.g., a volume table of contents VTOC) record of any element for which library service is wanted, and using that field for filling-in and binding our proven library catalog entries describing the attributes and relationships to other library-managed elements.

ACCESS CONTROL

Figure 3:
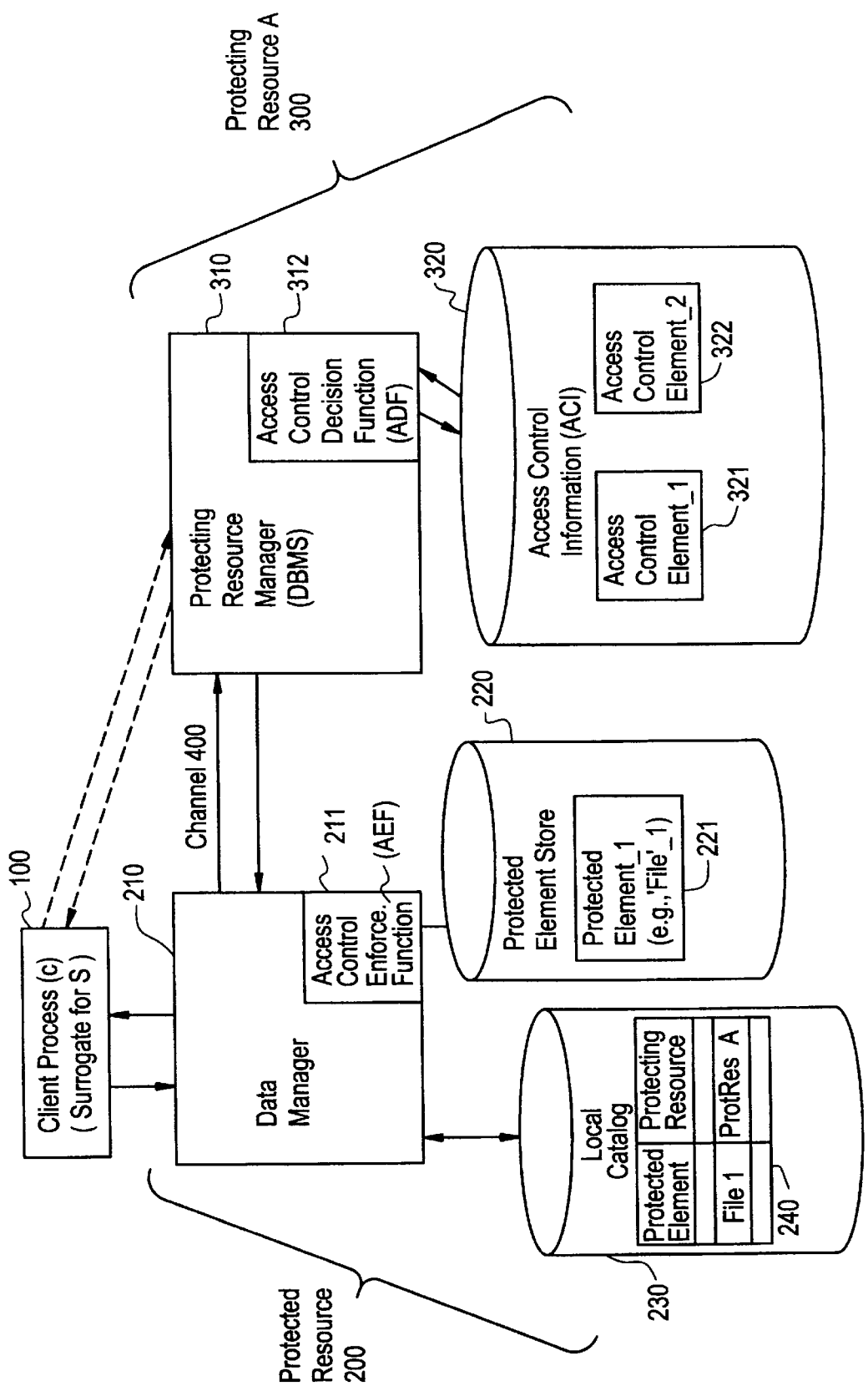
FIG. 3 is a block diagram of a preferred embodiment of an object-oriented access control system according to the present invention.

An object-oriented access control system according to the present invention is shown in FIG. 3. Here a client process 100, which acts as a surrogate for a subject S, is connected to a protected resource 200, and the protected resource 200 is connected via a communications channel 400 to a protecting resource 300.

Protected Resource

The protected resource 200 is a collection of procedures and data elements that is encapsulated so that the internal structure of a data element is accessible only to the procedures of the protected resource, and the procedures may be called only at designated domain entry points.

More specifically, the protected resource includes a data manager 210. The data manager 210 is a set of procedures which defines the sole external interface to what is stored. Those procedures are responsive to commands passed from outside the data manager. The data manager 210 includes an access control enforcement function (AEF) 211, which is coupled to a protected element store 220. The AEF 211 provides the only paths to protected elements in the protected element store 220, and constrains access as intended by proper authorities, getting information about these intentions from one or more access control decision functions (ADF) or protecting authorities, as indicated in a local catalog 230. The ADF is part of a protecting resource 300 which may be either local or remote with respect to the protected resource. The present invention applies to the case where the protecting resource is remote with respect to the protected resource. Preferably, the data manager 210 is an existing software entity, such as a file manager, which is used "as is", except for adding an extension or making some small modifications which are discussed below.

The protected element store 220 contains protected elements such as protected element_1 (221) shown in FIG. 3. Here, the protected element 221 is synonymous with the object "o" whose access is controlled, preferably according to the discretionary permission function B discussed in Access Control For Large Collections. As discussed in that reference, several protected elements may be linked by pointers within the access control information to a single permission function chosen from a small set of permission functions. For mandatory access control, such as in military applications, the permission function B would conform to the Department of Defense (DoD) "Orange Book" (see *DoD Trusted Computer System Evaluation Criteria*, Department of Defense, National Computer Security Center DOD 5200.28 STD (Dec. 1985)) and possibly to the Bell-Lapadula model (see D. E. Bell and L. J. LaPadula, *Secure Computer System: Unified Exposition and Multics Interpretation*, MTR 2997, MITRE Corporation, Bedford, Mass. (July 1975)).

Also coupled to the data manager 210 is the local catalog 230. The local catalog 230 binds a protected element within the protected resource to a protecting resource which contains access control information for that protected element. The local catalog 230 is similar to the Cabrera et al. database table, in that the local catalog 230 points to, either directly or indirectly, an element outside the database. In Cabrera et al., the element external to the database is a file in a file system. Here, the local catalog 230 can refer not only to a file but can also refer to other types of elements. Moreover, the elements referred to by the local catalog 230 of the present invention need not be part of the same protected resource or library, or even in the same computing system or administrative domain. Of course, the local catalog 230 must be protected and itself subject to access control, preferably being accorded access control according to the present invention.

In a preferred embodiment of the invention the local catalog 230 is a pre-existing structure having space to add a small amount of information. An example of a local catalog is a volume table of contents (VTOC) in an existing operating system, such as IBM's MVS operating system. Here, in an entry in the VTOC for the protected element, a small amount of information, such as a single existing bit in an entry in the VTOC, is defined to indicate whether the protected element is to be handled according to the access control method linking of the present invention. For purposes of discussion, this bit will be referred to as the "enhanced access control method bit." If the enhanced access control method bit is set, for instance, then the access control of the present invention is to be performed. However, if the enhanced access control method bit is not set then the enhanced access control is not to be performed and the protected element is to be accessed as it normally would by a conventional data manager via its conventional access control process. That is, the choice indicated by the enhanced access control bit is between the enhanced access control process of the present invention and the conventional access process provided by the data manager. An exit routine, for example, can be provided in the data manager 210 which is executed when the protected element is to be accessed. The exit routine checks the enhanced access control method bit in the VTOC entry for the requested protected element. If the enhanced access control method bit is not set, control is immediately returned to the accessing routine so as to minimize delays in obtaining access to the protected element, and access to the protected element is provided in the conventional manner. In this situation the present invention's enhanced access control method would be virtually imperceivable to a client process since control is immediately relinquished by the exit routine. By immediately returning to the accessing routine, a performance impact is avoided for elements in which the enhanced protection is not to be provided. In the typical situation this case is expected to occur more frequently than providing the enhanced protection.

However, if the enhanced access control method bit is set, the exit routine would refer to another data structure which binds the protected element to a protecting resource, and ultimately to an access control element. Access control for the protected element would then proceed as discussed below in detail. When the present invention is used with existing data collections, it is believed that many, if not initially all, elements in the collection will not be provided with enhanced access control. Accordingly, by providing an indicator that enhanced access control is not to be performed, such as when the enhanced access control method bit is not set, the existing data collections can be used without interruption by the present invention. Moreover, by immediately returning control to the existing data manager when it is determined that enhanced access control is not to be provided, virtually no performance penalty is incurred by having the enhanced access control in place.

Alternatively, an existing VTOC could be altered to include all the information necessary to bind the protected element to the access control element, in which case it would be unnecessary to refer to a separate data structure.

Another example of a local catalog would be a UNIX file system directory. Other instances of a local catalog will be readily recognized by persons of ordinary skill in the art.

In the preferred embodiment of the present invention, the local catalog contains a identifier for the protecting resource 300. In this case the protecting resource 300 would provide the mapping between the protected elements and the access control elements. Where the protecting resource 300 is a library, as described in Antognini et al., the protected element ID can be an item/reptype/partnum triple.

Where the protected resource 200 is a library as described in Antognini et al., the local catalog entry identifies the item/part that represents the protected element. An item/part structure includes both optional part descriptors and optional item descriptors, any one of which can allude to arbitrarily complex library objects. In the preferred embodiment, the access control element identifier is held in the item record in the library database and is part of the item descriptor for the protected element. Accordingly, since the access control element is identified in the item descriptor, all parts which comprise that item will receive the same access control. In other words, if the protected element is a document comprised of a plurality of parts (e.g. a plurality of pages in a book), each page is provided the same access control, since the entire document (the book) has its access controlled by one access control element, namely, the access control element set forth in the item descriptor.

Alternatively, the local catalog can also contain, as an extension of the identifier for the protecting resource 300, an identifier for the access control element which relates to the protected element. The local catalog itself must be provided access control. More particularly, each row in the local database must be protected and the subject of access control (either discretionary access control or mandatory access control). That is, a row in the local catalog should be accessible only via one or more new operations for maintaining such rows, which should permit change only by the owner of the protected row via discretionary or mandatory controls as the case may be, as provided for the protected element itself according to the present invention.

As an artisan of ordinary skill would readily understand, the protected resource and client can each be comprised of software programs and/or data recorded on a computer-readable medium, and run on computing devices.

Protecting Resource

A protecting resource, such as protecting resource A (300) shown in FIG. 3, is similar to the protected resource, except that its data elements relate to protecting-elements rather than protected-elements. More specifically, a protecting resource 300 includes a protecting resource manager 310. The protecting resource manager 310 includes an access control decision function (ADF) 312 which performs an access control decision as described in detail in *Access Control for Large Collections*. Coupled to the ADF 312 is access control information (ACI) 320. The ACI 320 includes one or more access control elements, such as access control element_1 (321) and access control element_2 (322).

Each access control element can describe one, or more likely a plurality of protected elements, as discussed in *Access Control for Large Collections*. In a preferred embodiment of the present invention, the protecting resource 300 is a library, as described in Antognini et al., and the access control element is an item within that library, or in other words is an access control item. The access control item includes parts, identified within the access control item, which can be, for instance, access control lists as described in *Access Controlfor Large Collections*.

The protecting resource 300 can also contain pointers which point back to the protected resource 200 and the protected element 221, which may improve performance.

As an artisan of ordinary skill would readily understand, the protecting resource can be comprised of software programs and/or data recorded on a computer-readable medium, and run on computing devices.

Preparatory Steps

The preferred embodiment of an object-oriented access control method and system of the present invention operates in an environment in which certain preparatory steps have been taken. The preparatory steps are themselves well known generically and include the following.

A protected element 221, shown in FIG. 3, is created and resides within a protected element store 220 of the protected resource 200. An example of a protected element is a conventional file, and an example of the protected resource 200 is a conventional file system. In order to facilitate understanding of the invention the preferred embodiment is described with reference to files in a conventional file system. However, protected elements and protected resources of the present invention are not limited to conventional files and file systems, respectively, and can include other structures as discussed later in more detail.

Information, or a pointer, for each protected element 221 is stored in the local catalog 230. The protected resource 200 indicates, via the information stored in the local catalog 230, that access control information 320 for the protected element is to be sought in some specific protecting resource 300. The protecting resource 300 includes an access control element, such as access control element 321 or 322. The access control element corresponds to one or more of the protected elements. Information held in an access control element is bound to the ID of the protected resource 200 and the ID of the protected element 221 getting the protection by the pointer just mentioned. Such information may include an arbitrary number of descriptors useful in search, and may further include links which represent relationships of the protected elements to other data objects, which individually may or may not be under access control according to the present invention. As a part of this, there will be a link to an access control element as described in *Access Control For Large Collections*. Also, permissions are recorded in the access control elements, as described in *Access Control for Large Collection*.

A human user (hereinafter called the subject S) will login to the system to establish an authenticated identity and representative control blocks which are trustworthy within well-known limits. Within some administrative domain (such as all of the IBM Research Division) this can be done with well-known means. For example, the product "Kerberos" is such a means. See, for example, S. J. Lunt, "Experiences with Kerberos (Authentication System)," Proceedings of USENIX Workshop, UNIX Security II, pp. 113–119 (August 1990), and also S. M. Bellovin and M. Merritt, "Limitations of the Kerberos Authentication System," Computer Communications Review 20(5), pp. 119–132 (October 1990).

The access control system described in *Access Control for Large Collection* presumes that the access control element is part of the same library system as the protected element. For example, Antognini et al. describes a library service subsystem which includes a library server connected to a catalog store. The catalog store includes a database used as a control point for access to anything in that library. An administrative table is used by the library server to validate a request from any library client within the library containing the library server. An administrative table entry includes privileges accorded to a specific patron of that library. However, in such a system, the administrative table used in providing access control must be part of the library it services.

Unlike the access control system described in *Access Control for Large Collections*, in the present invention the protected resource 200 and the protecting resource 300 are distributed with respect to one another. In other words, the protected resource 200 and protecting resource 300, in terms of Antognini et al., need not be part of the same library, or in the same computing system, or even in the same administrative domain. Accordingly, a communications channel 400 (hereinafter "channel") is required for connecting the two. The channel connecting protected resource 200 and protecting resource 300 is established by a well-known means for securing and otherwise managing interprocess communications, either locally or between processes executing remotely from each other. Interprocess messages include structure sufficient so that receivers can validate the content and provenance of these messages, and means for doing this are well-known. Preferably, the channel is initially established using a method for sending a secure cryptogram over an insecure communication channel without prearrangement of a cipher key, as described in U.S. Pat. No. 4,200,770 to Diffie and Hellman. Once the secure cryptogram is sent over the communication channel the security of the link can be maintained according to other more efficient methods, such as the encryption method according to the Data Encryption Standard (hereinafter "DES"), as set forth in Federal Information Processing Standard (FIPS) Publication 46-1-1988, National Bureau of Standards, U.S. Department of Commerce, Washington, D.C. (January 1977). Depending on the nature of the traffic between the protected resource 200 and the protecting resource 300, the channel can be maintained indefinitely, or alternatively can be established as discussed above, each time a set of messages must be transferred between the protected and protecting resources.

In common systems practice, there is a login process which establishes a trustworthy, enduring binding between a human user, one or more machine processes acting at as surrogates for that user, and control blocks which may be used locally or transmitted to certify that operations are requested on behalf of and with the authorization of that user. For the period in which any such binding is valid, the human user and the bound surrogate process need not be distinguished between when authorization and access to resources are discussed. "Time-of-check-to-time-of-use" considerations and other factors which govern the trustworthiness of this user information at its source, and as it is transmitted among processes, follow well-known procedures and are subject to well-known limitations. Accordingly, those considerations are not further described.

Access Control Operation

Figure 4:
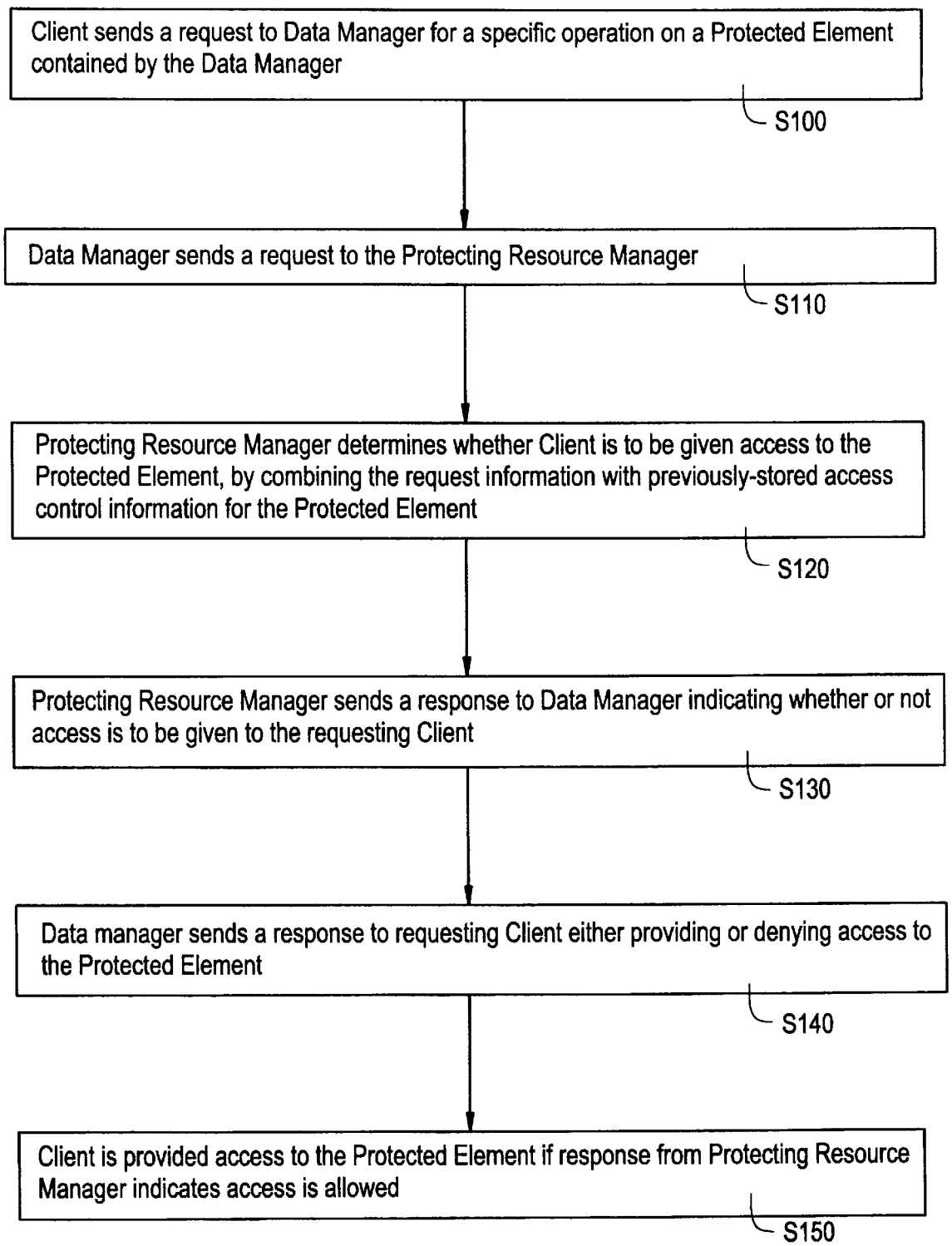
FIG. 4 is a flowchart showing the operation of the present invention according to a preferred embodiment of the invention.

An access control operation according to a preferred embodiment of the present invention is now described with reference to FIGS. 3 and 4.

Some request by an application programming executing in some client process 100 on behalf of a subject S occurs. That is, the client process 100 sends a request for a specific operation to be performed on a specific protected element 221, for example. The request is sent to the data manager 210 of the specified protected resource which contains the protected element 221 (S100). The request contains an authenticated identifier of the requesting subject S, together with whatever descriptors of this subject S and the operating environment might be required for authorization, but which are not otherwise available to the protected resource and/or protecting resource. An example of a request from the client process 100 is an OPEN request to open a file, such a File_1, stored in the protected file system (i.e., protected resource 220).

The portion of the data manager 210 which must act on the request (e.g., an OPEN subroutine which is part of the file subsystem) optionally augments the request with additional information which may be needed by the protecting resource 300, and sends to the protecting resource manager 310 whatever subset of this enlarged request the protecting resource manager 310 requires (S110).

The enlarged request is received by the protecting resource manager 310, which provides that message to an access control decision function (ADF) 312 in the protecting resource manager 310. The ADF 312 decides whether or not access is to be granted by combining the request information with previously-stored access control information 320 as described in *Access Control for Large Collections* (S120). Based on the decision by ADF 312, the protecting resource manager 310 returns to the data manager 210 either in affirmation or denial for the request (e.g., YES/NO), optionally augmented with whatever additional information might be useful to the data manager 210 for executing the request (S130).

Assuming ADF 312 determines that access is to be granted, and a YES is returned, an access control enforcement function (AEF) 211 in the data manager 210, executes the request (i.e., OPEN), returning to the client 100 whatever information the request calls for, optionally augmented by a success return code (S140, S150). If ADF 312 returns a NO, the data manager 210 returns a failure return code to the client 100, optionally augmented by additional information deemed useful to the client 100 (S140).

More specifically, when the client process 100 sends a request to data manager 210 to open File__1, the data manager 210 consults a local catalog 230, such as a VTOC within the file subsystem. Within the local catalog 230, is the table 240 containing an identifier for the requested protected element 221. Here, the protected element 221 is File__1. Within the local catalog 230, which is a VTOC, File__1 is located in table 240 and an associated protecting resource is identified for File__1 within the VTOC. That is, the VTOC contains an entry associating File__1 with a specific one of one or more protecting resources.

Alternatively, the VTOC can contain only a minimal field, such as a single bit, which indicates whether or not enhanced access control according to the present invention is provided. If so, a separate table is read containing a entry associating File__1 with a protecting resource. Accordingly, the local catalog 230 (i.e., VTOC) identifies the protecting resource associated with the protected element. Here, protecting resource A is associated with File__1, and hence, is identified via the VTOC as the protecting resource for File__1. That is, within protected resource 200 the entry in the VTOC for File__1 identifies protecting resource A as containing the access control information 320 for File__1. Here, access control element 321 is associated with File__1 in the VTOC. An example of an identifier for identifying the protecting resource is a Uniform Resource Locator (URL). In the event enhanced protection is not provided for File__1, then access is provided to File__1 as would be conventionally provided by the protecting resource manager 210.

Data manager 210, upon determining that protecting resource A is the protecting resource for File__1, sends a message over the secure channel 400 to protecting resource A. The secure channel 400 is established prior to sending the message in order to provide for secure communications of the interprocess messages, although it could be established in response to a request to send the message. With the message sent by data manager 210 is information identifying the requested protected element, File__1. Also included in the message is any information needed by ADF 312 for evaluating whether or not client 100 is to be given access to File__1. Protecting resource manager 310 provides to ADF 312 the required information from the message received from data manager 210.

ADF 312 uses access control information (ACI) 320, and in particular uses access control element 321 corresponding to File__1, which contains privilege information for that protected element. ADF 312 evaluates the access control decision function based on the information contained in the received message and the access control element 321, as described in *Access Control for Large Collections*. ADF 312 returns either an affirmation or denial for the permission requested of the protected element (File__1) by client process 100. Accordingly, protecting resource manager 310 returns, over secure channel 400, a response indicating a YES or NO as to whether client process 100 is to be granted the permission requested with respect to File__1, along with other optional information protecting resource manager 310 may provide.

Data manager 210 passes the request from client process 100 along with the YES/NO response from protecting resource manager 310 to access control enforcement function (AEF) 211. If and only if access is permitted, the AEF 211 performs the requested service and provides client 100 with access to the protected element. Here, where the exemplary request is to open File__1, AEF 211 opens File__1 for client 100, if the response from protecting resource manager 310 is YES. However, if the response from protecting resource manager 310 is NO, then data manager 210 responds to the request of client process 100 by denying the request, and optionally returns other useful information to client 100.

As described above, a specific permission can be requested with respect to the protected resource, and a YES/NO response returned for that specific permission. Alternatively, the request to the protecting resource 300 can just indicate the protected element, subject and environmental conditions, and the protecting resource 300 can return a table of operations/permissions, with the protected resource choosing the right permission from that table.

The present invention allows application programs residing at the client 100 to access protected elements, without requiring modification to those application programs. Moreover, the protected elements (e.g., existing files) need not be copied or moved. By providing in the local catalog 230 a mapping between a protected element and one of one or more protecting resources, a highly flexible access control system is achieved without requiring any change to existing application programs or to protected elements (i.e., data) which may already exist. Moreover, only extensions to, or slight modifications to existing data managers are needed for the invention.

The access control system and method of the present invention provides flexibility in implementing access control by allowing access to a protected element to be controlled according to one of a plurality protecting resources. Simply by changing the association between protected element ID and protecting resource ID in the local catalog 230, the protecting resource, and hence the access control attributes of the protected element can be changed.

Protected Resources

While today user authentication is reliable only within some (possibly large) administrative domain, various efforts exist to extend such reliability across otherwise autonomous administrative domains. The applicability of the current invention extends to include within its scope actions within and across such distributed, autonomous administrative domains. That is, some of the protected resources might reside in domains remote from the protection mechanisms and the protection mechanisms may themselves be distributed across such otherwise autonomous domains.

Although in the preferred embodiment protecting files and file systems remote from some protecting database is described, the present invention applies to local resources as well as remote resources within local and several remote resource pools being protected within a single assemblage. Furthermore, the protected elements include, but are not limited to the following:

a. Files within file systems;
b. Data blocks within relational DBMS' such as might be selected by relational views;
c. In a hierarchical data base, such as a database managed by IBM's IMS, data collections each connected by links in the structure of a directed acyclic graph.

d. More generally, in any database of any kind whatsoever, the structure defined by a query applicable to that kind of database. Such queries are exemplified by, but not limited to, queries described in M. Stonebraker and D. Moore, *Object-Relational DBMSs*: The Next Great Wave, Morgan Kaufman Publishers, San Francisco, (1996).

e. Directories, such as a UNIX directory, for example.

f. Ephemeral resources, such as dynamic objects within Smalltalk or C++. These are processes running in local or remote computing systems, and can obtain similar protection to that provided for the kinds of objects already mentioned, except that for such dynamic processes referential integrity is not considered, rather the discussion of the present invention is directed to access control protections and to providing relationships for such protected elements. Such objects can themselves be distributed, with the stubs running in client machines and operative pieces in server machines.

Interprocess Protocols

In interprocess protocols employed within the preferred embodiment of the present invention, the interprocess protocols start with a client process being reliably bound to a user. This protocol has the client 100 send a request to a protected resource 200 which in turn sends an authorization checking request to a protecting resource 300 and receives a YES/NO answer. Although, other satisfactory protocols can be used, and the present invention is not limited to the above-described interprocess protocol. It should be noted that if the calls to the access control interfaces of the present invention are made in the server machines, the client-server isolation provides the separation which must otherwise be provided by operating system services (such as a supervisor state) to achieve full-proof protection.

An alternative configuration is where the protecting resource is implemented so that it is arranged to run in the protected resource and the channel 400 is embedded therein.

Alternative Embodiments

Other embodiments of the invention are directed to alternative protocols between the client process, the protected resource and the protecting resource, as discussed below.

Figure 5:
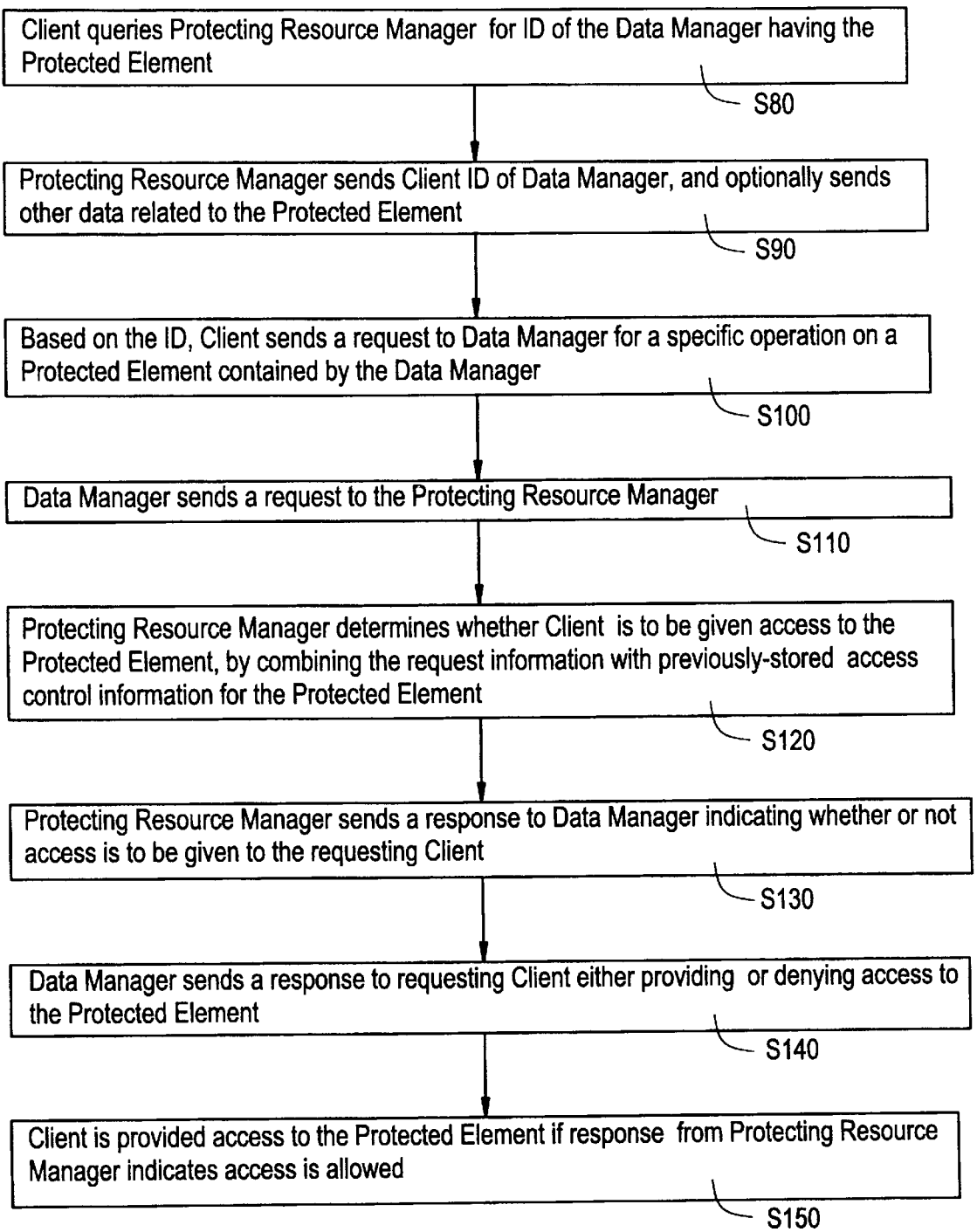
FIG. 5 is a flowchart showing the operation of the present invention according to a second embodiment of the invention.

FIG. 5 shows another embodiment of the invention in which the client process 100 queries the protecting resource manager 310 for the ID of the data manager having the protected element and for the ID(s) of the protected element (s) of interest (S80). The protecting resource manager 310 sends to the client process 100, the ID of data manager 210, and optionally sends other data related to the protected element 221 (S90). Based on the ID, client process 100 sends a request to data manager 210 for a specific operation to be performed on the protected element 221 contained in the protected resource 200 (S100). Upon receiving the request, data manager 210 sends a request to the protecting resource manager 310 (S110). Protecting resource manager 310 determines whether the client process 100 is to be given access to the protected element for the requested operation, by combining the request information with previously-stored access control information for the protected element (S120). The protecting resource manager 310 sends a response to data manager 210 indicating whether or not access for the requested operation is to be given to the requesting client process 100 (S130). Data manager 210 sends a response to requesting client process 100, either granting or denying the requested access to the protected element (S140). The client process 100 is provided access to the protected element for the requested operation if the response from protecting resource manager 310 indicates access for that operation is granted (S150).

Figure 6:
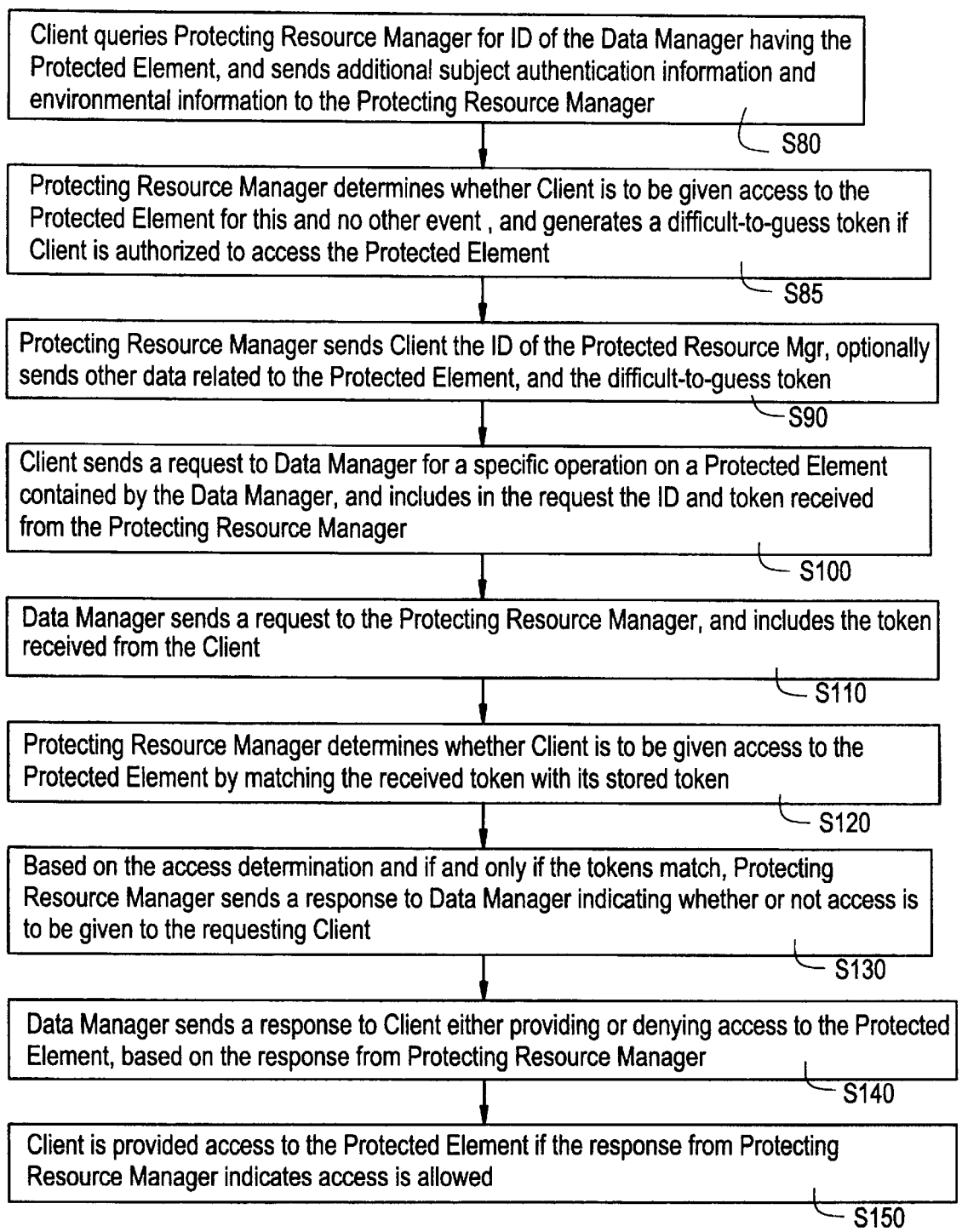
FIG. 6 is a flowchart showing the operation of the present invention according to a third embodiment of the invention.

In yet another embodiment, shown in FIG. 6, the client process 100 queries the protecting resource manager 310 for the ID of the data manager 210 having the protected element and for the ID(s) of the protected element(s) of interest (S80). The protecting resource manager determines whether the client is to be given access to the protected element for this and no other resource element access, and generates a difficult-to-guess token if the client is authorized to be provided access to the protected element (S85).

The difficult-to-guess token must also have the properties of a signature, that is, being difficult to forge, and may optionally contain encrypted information that only the protecting element can decrypt. Further, by table lookup or other means, such as decryption, the protecting manager can determine whether it was the source of the token and for what element(s) it is a ticket. Security management by tickets and certificates are generally well-known technologies which are used here as conventionally intended.

The protecting resource manager 310 sends to the client process 100 the ID of the data manager 210, and optionally sends other data related to the protected element and the difficult-to-guess token (S90). Based on the ID, client 100 sends a request to data manager 210 for a specific operation on a protected element contained by the protected resource 200 and includes in the request the ID and the token received from protecting resource manager 310 (S100). Data manager 210 sends a request to the protecting resource manager 310 which determines whether client 100 is to be granted access to the protected element (S110). Along with the message the token from the client is sent. The token can contain all the information needed to make the determination. That is, the token can contain access bit patterns and further conditions such as time-of-check-to-time-of-use constraints, as well as the expected nonce and process identifiers. The determination is made by matching the received token with the protecting resource manager's stored token (S120). Alternatively, the determination can be made by combining the request information with previously-stored access control information for the protected element. Based on the access determination and if and only if the tokens match, the protecting resource manager 310 sends a response to data manager 210 indicating whether or not access is to be granted to the requesting client 100 (S130). Data manager 210 sends a response to the requesting client 100 either granting or denying access to the protected element based on the response from the protecting resource manager (S140). The client 100 is provided access to the protected element if the response from protecting resource manager 310 indicates access is granted (S150).

Optionally, protection can be extended by including with the token, signature and certification packaging, via well-known techniques, in those embodiments which do not permit token passing to a third party. The signature and certification packaging can be used by the protecting resource to double-check that the client has not passed the token to some third party which is now masquerading as the client.

Figure 7:
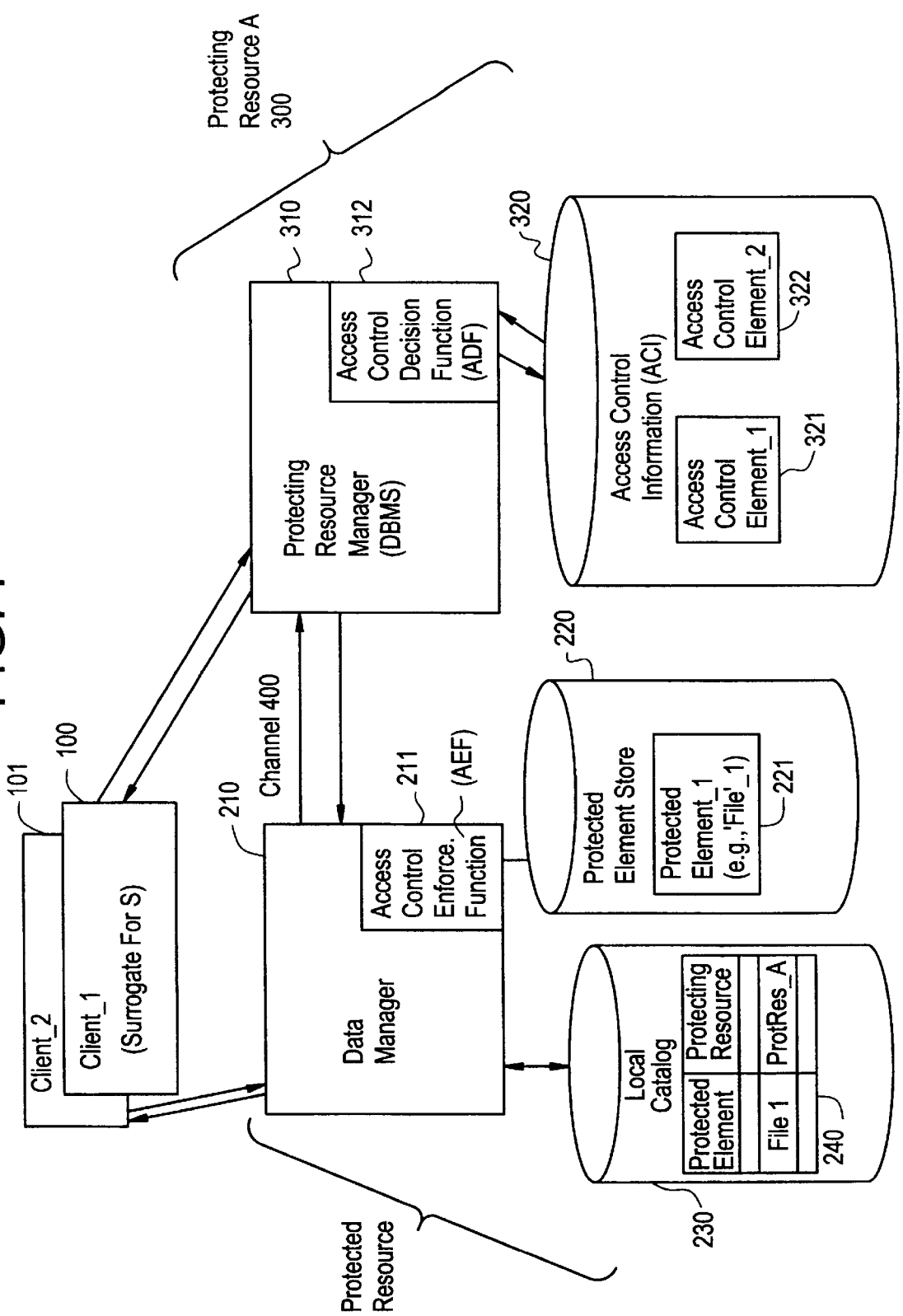
FIG. 7 is a block diagram of a fourth embodiment of the present invention.
Figure 8:
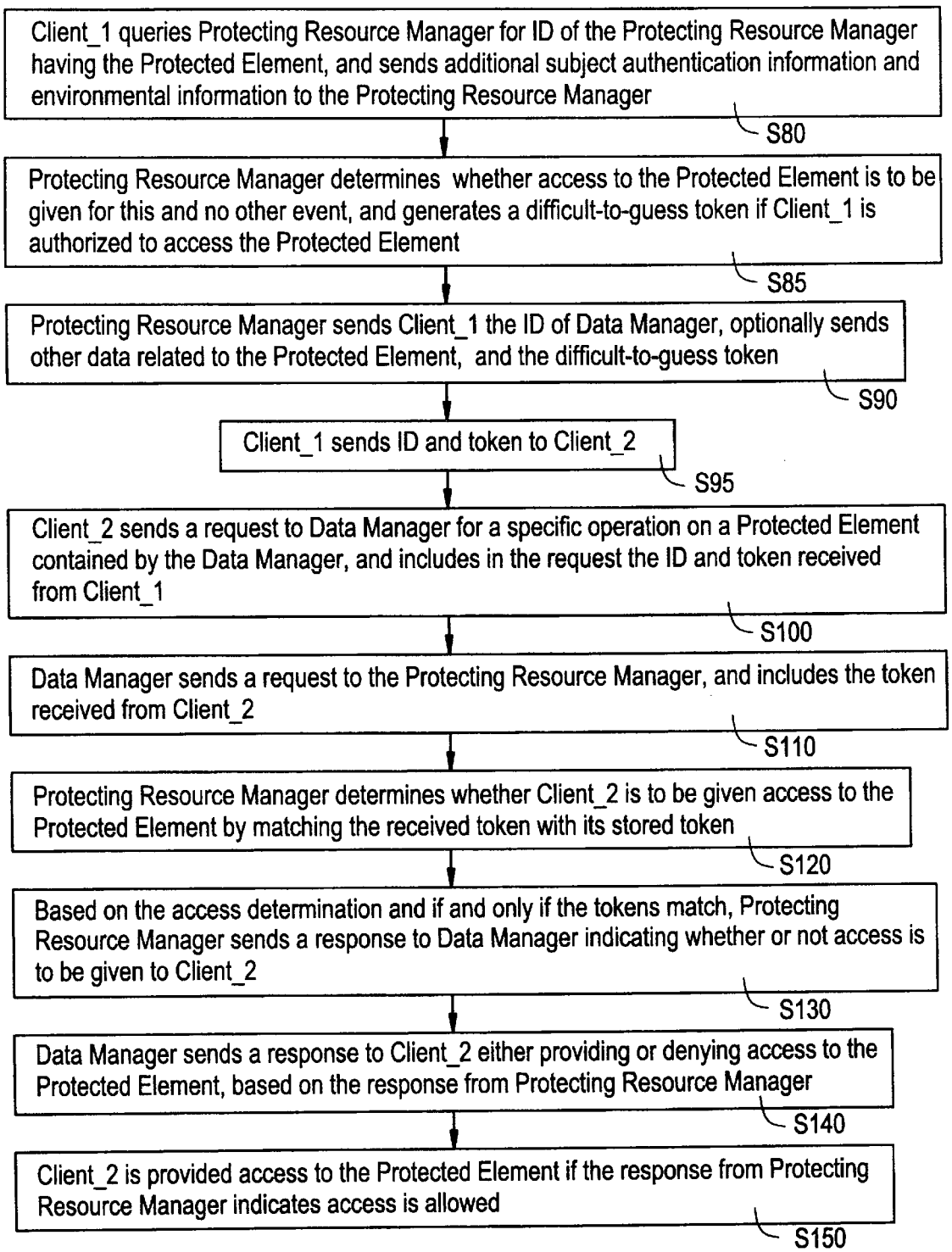
FIG. 8 is a flowchart showing the operation of the present invention according to the fourth embodiment of the invention.

In still yet another embodiment, shown in FIGS. 7 and 8, a first client process, Client__1100, queries the protecting resource manager 310 for the ID of the protected resource 200 having the protected element of interest, sending additional subject authentication information and environmental information to the protecting resource manager 310 (S80). The protecting resource manager 310 determines whether access to the protected element is to be given for this and no other resource element access, and generates a difficult-to-guess token if Client_1 is authorized to access the protected element (S85). The protecting resource manager 310 sends Client_1 the IID of the protected resource, the difficult-to-guess token, and optionally sends other data related to the protected element (S90). Client_1 then sends the ID and token to Client_2 101 (S95). In response to receipt of the ID and token, Client_2 sends a request to data manager 210 for a specific operation on a protected element contained by the data manager 210, and includes in the request the ID and token received from Client_1 (S100). The data manager 210 sends a request to the protecting resource manager 310, and includes the token received from Client_2 (S110). Protecting resource manager 310 determines whether Client_2 is to be given access to the protected element, by combining the request information with previously-stored access control information for the protected element, and by matching the received token with its stored token (S120). Based on the access determination and if and only if the tokens match, the protecting resource manager 310 sends a response to data manager 210 indicating whether or not access is to be given to Client_2 (S130). Data manager 210 sends a response to Client_2 either granting or denying access to the protected element, based on the response from protecting resource manager 310 (S140). Client_2 is provided access to the protected element if the response from protecting resource manager 310 grants access (S150).

In the alternative embodiments discussed above and shown in FIGS. 5–8, as well as in the preferred embodiment, in step S90 the protecting resource 300 can return a set of responses, each identifying what is currently represented in the protecting resource 300. Accordingly, in a subsequent step the client can select some of the members of the set of responses based on the other data optionally sent, and for each selected member execute the steps following step S90.

Furthermore, for each of the embodiments discussed above, the handshaking between the client 100 and the protecting resource 300 might alternatively have the protecting resource mention only the subject ID and the protected element ID and receive a vector of permissions accompanied by a vector of reason codes associated with denials, and itself select the currently appropriate vector component(s). A good representation of the response here would be a vector of integers rather than a vector of bits, with "0" indicating permission and every other value indicating a reason for denying permission. Subject to the usual "time-of-check-to-time-of-use" considerations, the protecting resource would cache such vectors, thereby saving steps S90 and S100 in subsequent queries. This strategy is worthwhile if and only if the probability of use is conditionally increased by the occurrence of use for the subject and element in question.

FEDERATED DIGITAL LIBRARIES WITH MANAGED LINKS

Figure 9:
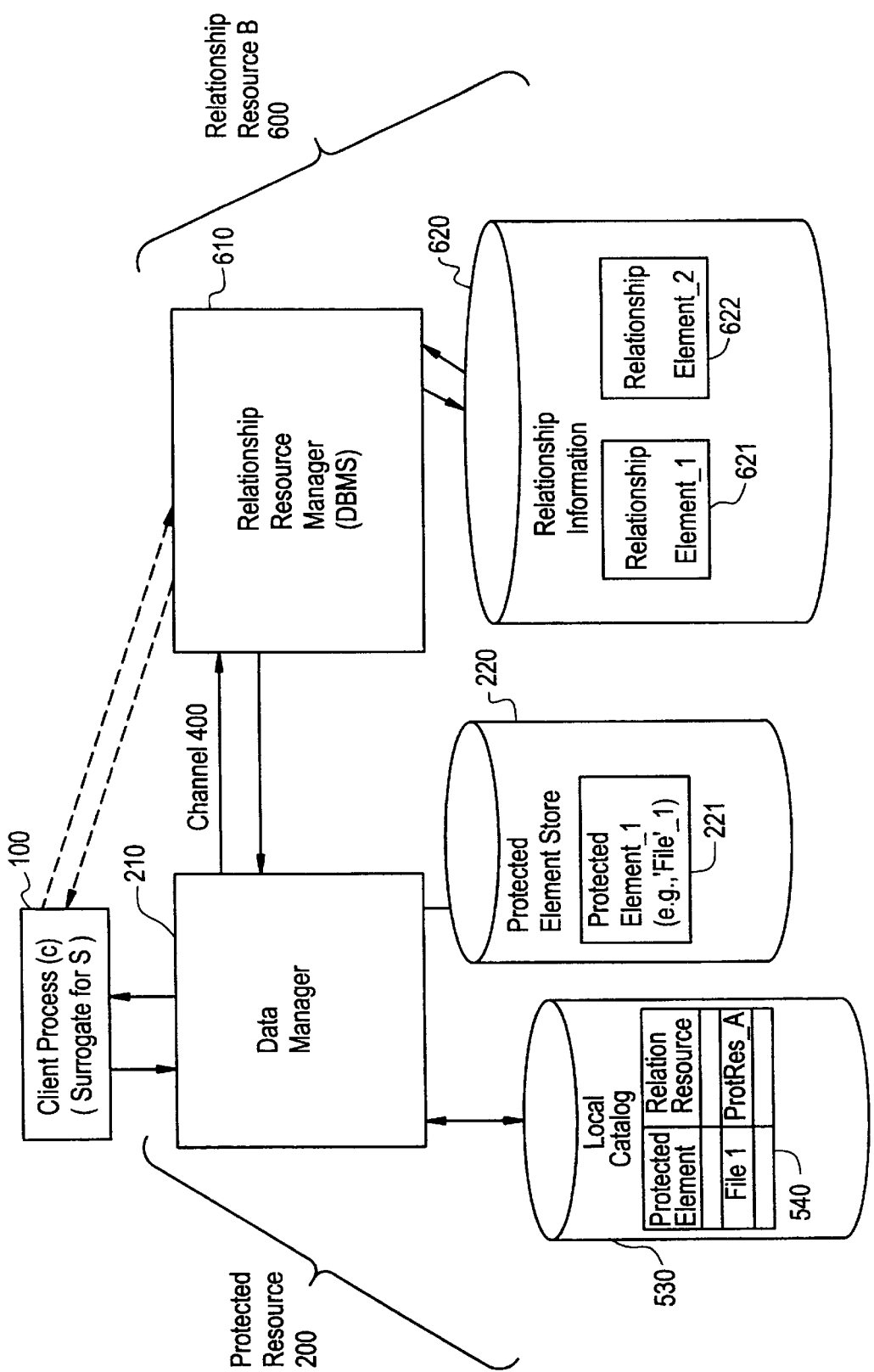
FIG. 9 is a block diagram of a fifth embodiment of the present invention.

A structure, similar to that described above for providing access control, can be used in a more general sense to provide for creating a federation of digital libraries by relating meta-data to an existing element, such as a protected element in protected resource 200, shown in FIG. 9, via managed links. Here, meta-data refers to data describing an element. The table schema described in H. M. Gladney, External Design of a Document Storage Subsystem, IBM Research Report RJ 8267 (1991), which is incorporated herein by reference, are examples of usefutl meta-data. The meta-data structures described in that reference are essentially implemented in IBM's DIGITAL LIBRARY products. In the case of a library model, containing documents, the meta-data describes a document in the library. For example, the name of a document can be meta-data for that document, as can the date of its creation.

Relationship Resource

Figure 1:
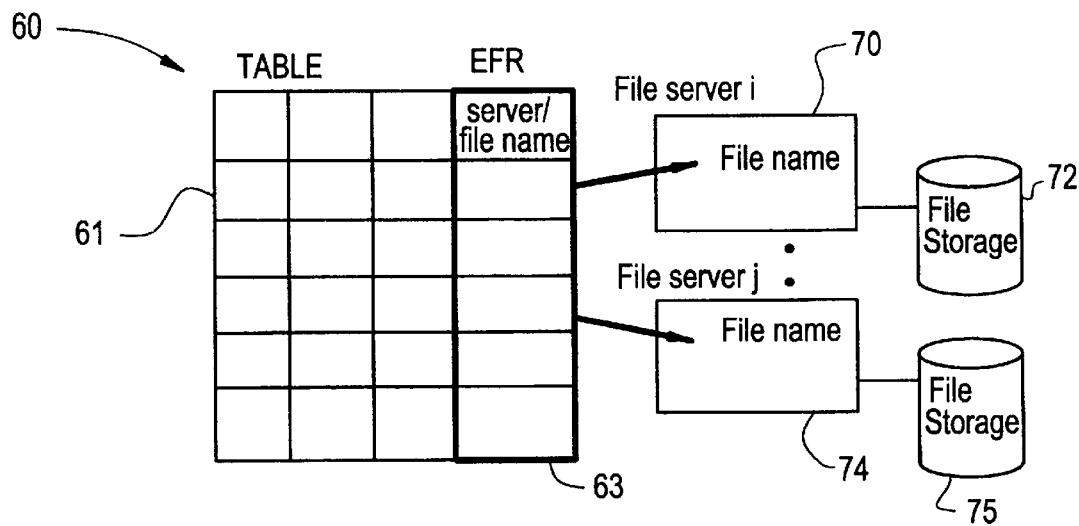
FIG. 1 is a conceptual diagram of a database extended to include a conventional Cabrera et al. efr field.
Figure 2:
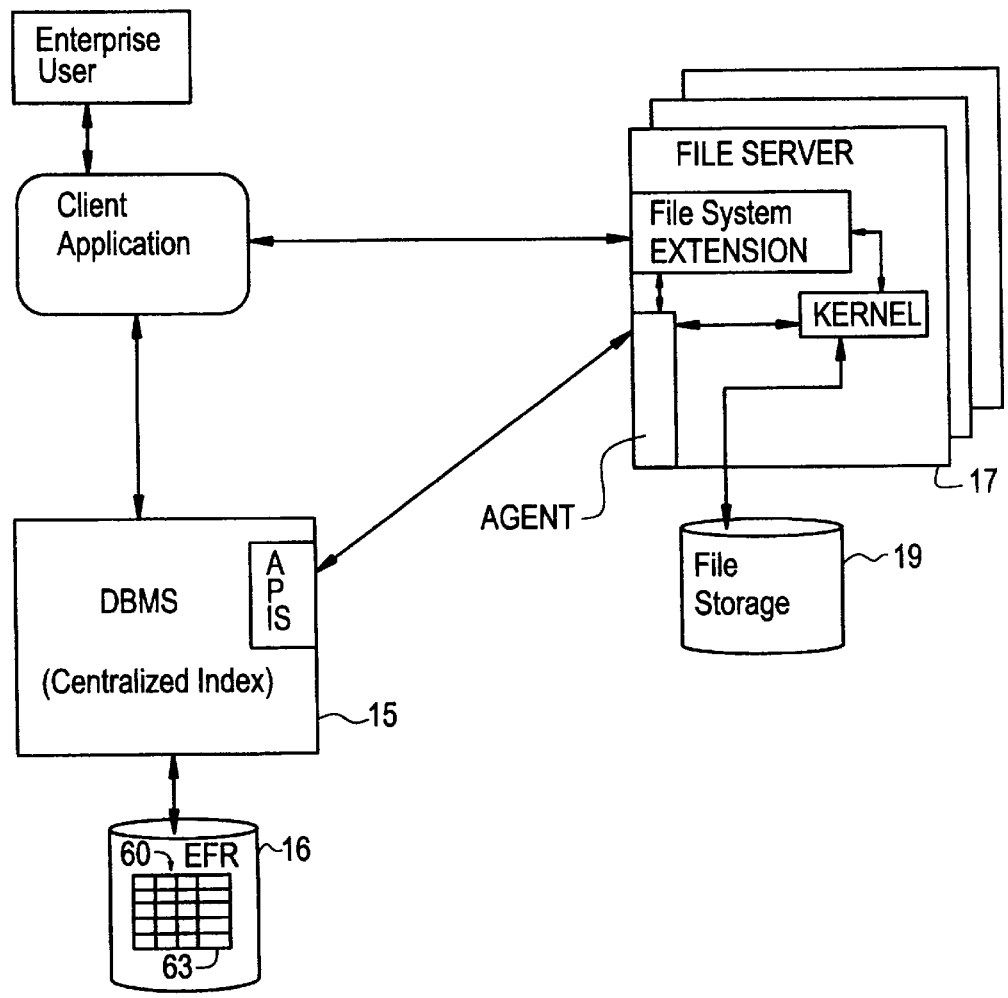
FIG. 2 is a block diagram of a Cabrera et al. system showing connection to several file servers.

A special case of such meta-data is a relationship element, residing in a relationship resource, which relates information residing in heterogenous data stores that have been related only in the minds of people within the organization, or in ad files and databases which have little or no managed relationship to the document element representations of interest, and little or no commonality one to another. Information stored in various protected resources, such as protected resource 200 shown in FIG. 9, can be related to other information stored in either the same or another protected store through a mechanism similar to that described above for providing access control. This information of interest can also be stored in an unprotected resource or in the relationship resource. That is, at least one of the items referred to in the relationship element can reside in either an unprotected resource or in the protecting resource such as the library subsystem of Antognini et al. The preferred system for implementing this method replaces the protecting resource 300, of FIG. 1, with a relationship resource 600, as shown in FIG. 9.

The relationship resource 600 includes a relationship resource manager 610 which receives and responds to messages from the data manager 210. Connected to the relationship resource manager 610 is relationship information 620 which contains relationship elements, such as relationship element_1 (621) and relationship element_2 (622). The relationship resource 600 preferably is a library as described in Antognini et al., and the relationship elements are items in that library. Since the relationship elements 621 and 622 are items in the library, they can contain parts. Such a structure readily provides for operating on a document-based data model, including representations of folders, filing cabinets and other common office constructs.

Figure 10:
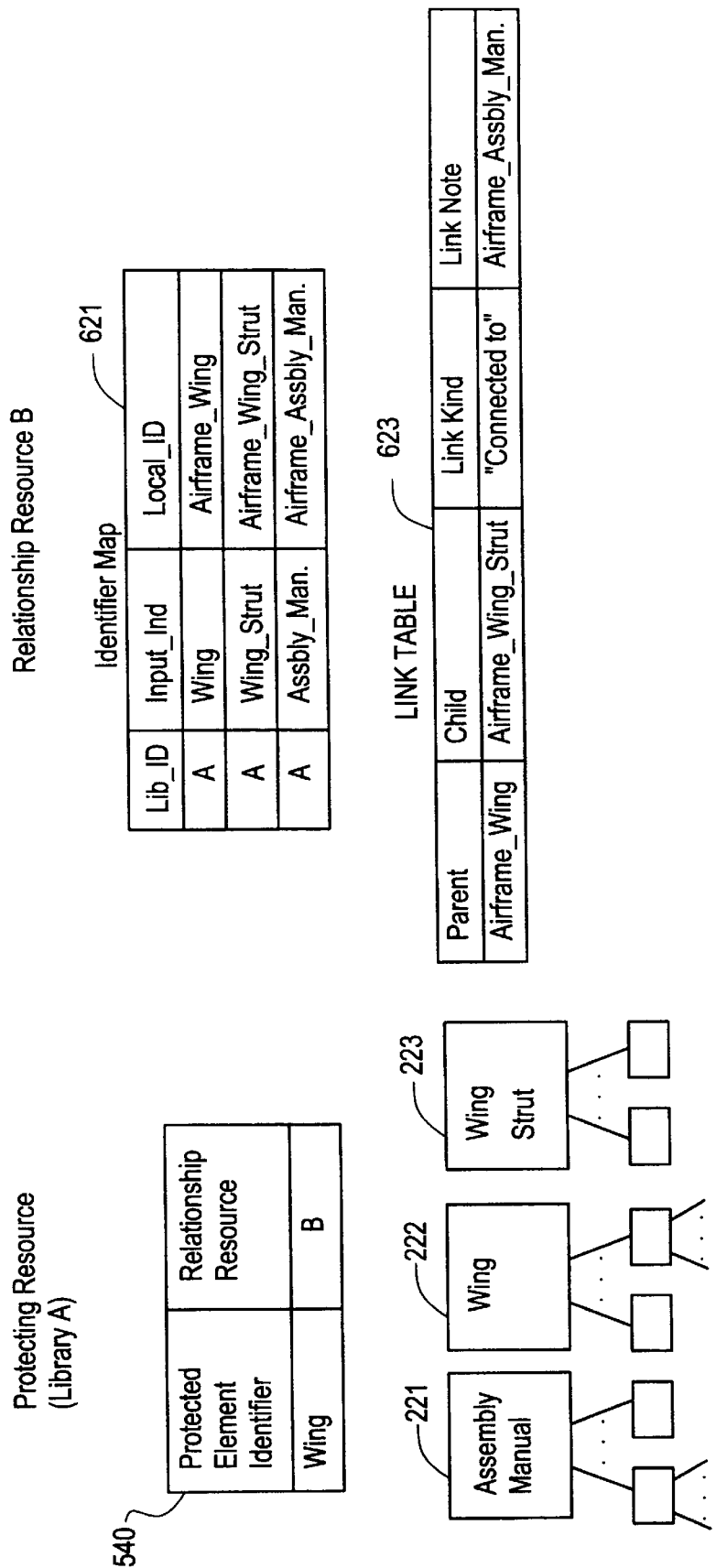
FIG. 10 is a conceptual diagram of tables used in the system of FIG. 9.

The local catalog 530 in the protected resource 200, includes, at least logically, a table 540 mapping protected elements to relationship resources, much as in the case for access control where the local catalog maps a protected element to a protecting resource. The local catalog must include sufficient space in a set of fields, either directly in the table 540, or through indirection to a different structure, which can be profitably used. That is the fields must be sufficient to identify a relationship resource and optionally a relationship element within that relationship resource. Further optimization information can also be recorded in those fields, such as a data type with a union of data types. An example of the data type is a type of a specific relationship resource or relationship element. A conceptual view of this is shown in FIG. 10. Here, table 540 is part of the local catalog 530. Table 540 may be a VTOC in a file system, or an item table in a library system. Table 540 directly binds a protected element to a specific relationship resource.

EXAMPLES

An example of a use of the invention is in airframe manufacturing. FIG. 10 shows a conceptual view of protected elements, in this case documents 221–223, stored in an airframe manufacturer's protected resource, which in this case is a library, denoted as Library A. Here, document 222 is a complex element, having a plurality of parts, which describes the wing of an airframe. Another document 223 describes a wing strut, which is connected to the wing. Yet another document in the library is an assembly manual 221 which itself is a complex element comprising a plurality of parts, and which describes among other things, how the wing strut is to be connected to the wing.

In conventional systems such documents may be related only in the minds of individuals within the manufacturer's organization, or in ad hoc databases or files which have little or no managed relationship to the document element representations of interest, and little or no commonality to one another. The present invention provides for binding the protected elements, or in this case documents, by extending a conventional table, such as an item table in Library A, to associate with the protected element a relationship resource which may hold meta-data for the protected element. That meta-data may be a relationship element defining a relationship between the protected element and existing data, any of another protected element, unprotected external data, or even with a physical object (such as a book on a bookshelf).

In the example depicted in FIG. 10, when a client requests meta-data for a protected element, such as for the wing document 222, the data manager 210 refers to table 540 to determine if a relationship resource is bound to that document. If so, data manager 540 sends a message to the relationship resource bound to the document of interest. Here, relationship resource B (600) is bound to "wing". Data manager 210 sends a message to relationship resource B along with an indicator (Input_Ind) of the protected element of interest, namely, document "wing" 222. A relationship resource manager 610 receives the message and using an identifier map 621, determines a local identifier (ID) for the protected element of interest based on Input_Ind.

Here, the local ID for the "wing" document is "Airframe_Wing". In a preferred embodiment of the invention the relationship resource includes a link table, as described in H. M. Gladney, *A Storage Subsystem for Image and Records Management*, IBM Systems Journal 32(3), pp. 512–40 (1993), which is incorporated herein by reference. The link table includes Parent, Child and LinkNote columns, each of which can refer to an item in a library. The link table also includes a Linkind column for defining the type of link represented. Here, a link table 623 of relationship resource B includes a row linking Airframe_Wing with Airframe_Wing Strut, and indicating that the kind of relationship is "connected to" meaning that one is connected to the other. The same row also relates the Airframe_Wing to another, possibly complex, item, namely, Airframe_Assbly_Man. Based on the identifier map 621, the relationship information corresponding to "Wing" (i.e., Wing_Strut and Assbly_Man. item IDs) is returned to protecting resource 200 (e.g., Library A). The data manager 210 can return the relationship information to the requesting client, which can than attempt to obtain access to the related documents since they have been identified to the client.

In the event no relationship information for the subject protected element is found, an appropriate message indicating the same can be returned and passed to the client.

In another embodiment, the protected elements in protected resource may be any other type of persistent data, in addition to documents. Similarly, the relationship elements in a relationship resource are not limited to documents in a library. Furthermore, the meta-data held in relationship elements can be data other than relationship data. That is, the elements in the relationship resource can contain information other than relationship information, such as descriptive information about the subject protected element.

Another example of an application of the invention relates to real estate records. The protected resource may be library containing a map document and a lease document for a building on land encompassed by the map. The link table can also contain a parent location field and a child location field. The parent location field holds position information, such as grid coordinates on the map. Similarly, the child location field also holds position information relating to a position within the element in the child field. Here, map coordinates for the location of the building which is the subject of the lease document identified in the child field, is held in the parent location field. The child location field, optionally, can specify a location in the child document. For example, the child location field can specify a certain paragraph in the lease relating to the location of the property. By associating in table 540 of the local catalog, the map with relationship resource B having the link table described above, a client can determine a relationship between the map and the lease document, which previously may not have been readily determined.

Yet another example of using the federated digital libraries of the present invention relates to using the structures described here to build relationship information for elements located in various collections. That information describes existing relationships between that located element and other elements in the same or different collections.

More specifically, for the kind of library in question, a program can be used for crawling a web of connected resources to find protected resources and resources worthy of protection. The World-Wide Web (hereinafter, "WWW") is an example of such a web of connected resources. The program can inspect those resources to discover elements or documents (e.g., pages) which can be identified as images of periodical articles which contain citations to other elements. Based on those links that are inspected, the program builds links and other meta-data for the located elements, in a relationship element, together with appropriate additions to the local directories associated with the located elements.

For each such cited element found, the program determines whether or not the cited element is itself part of a protected resource. For any element which is not part of a protected resource, a script element, which is a computer program consisting of commands, is used to convert the unprotected element into a protected resource. The script element, which if issued by the originator of the crawl or of a suitably authorized other user, adds to the data manager of the unprotected element a virtual object manager (for cases like Unix file systems) or exit routines (for cases like MVS file systems). The script further converts the unprotected element into a protected element, linked into the protecting resource to which the source element belonged, together with whatever additional pointers, links, and attributes are deemed helpful to normal library services and to the protection and relationship services as described herein.

Extracting links from WWW documents has been just treated by S. Hitchcock, L. Carr, S. Harris, J. M. N. Hey, and W. Hall, *Citation Linking: Improving Access to OnLine Journals*, Proc. 2nd ACM Intl. Conf. on Digital Libraries, 115–122, (July 1997). This proceeds using heuristics to discover citation strings in existing WWW documents, with the usual difficulties of such approaches, and the major problem that most cited documents are outside the domain of the WWW.

As an artisan of ordinary skill would readily understand, the protected resource, client and relationship resource can each be comprised of software programs and/or data recorded on a computer-readable medium, and run on computing devices arranged in a distributed manner. Furthermore, the present invention, while described in terms of the client, protected resource and protecting resource being implemented in a client-server arrangement, can also be implemented where one or more of those entities run in the same machine.

As described above, the present invention provides for a robust, flexible means for relating information present in existing data collections while requiring very few changes to existing software components, and no changes to the existing stored data. Moreover, the invention allows for conventional access to, and processing of that data with virtually no impact on performance.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of associating a first element, a second element and meta-data related to the first element, wherein the first element is a protected element and is within a first protected resource, the second element is a protected element and the meta-data is within a relationship resource, the first and second elements being bound to first and second index elements, respectively, the method comprising:

identifying the relationship resource in response to a request for the meta-data related to the first element;

sending a message to the relationship resource for return of the meta-data;

locating the meta-data in response to the message; and sending the located meta-data to the first protected resource, wherein the first protected resource and the relationship resource are in a distributed arrangement, and the relationship resource indicates a relationship between the first element, the second element, and the meta-data, wherein a requestor sends to the first protected resource the request for the meta-data related to the first element, and the meta-data is returned to the requestor only if the requestor is authorized to access the first element.

2. The method as recited in claim 1, wherein said identifying the relationship resource is performed by searching a catalog for the first index element, wherein the first index element includes an identifier of the relationship resource.

3. The method as recited in claim 1, wherein said locating the meta-data is performed by determining an identifier in the relationship resource for the first element, locating an entry in a table in the relationship resource based on the identifier for the first element and reading from the located table entry location information for the meta-data associated with the first element.

4. A method of determining a relationship between a first protected element and a second protected element by using a relationship element, wherein the first and second protected elements are associated with first and second index elements, respectively, comprising:

reading the relationship element in response to a request for information related to the first protected element; and identifying the second protected element based on information read from the relationship element, wherein the relationship element is in a different data collection than at least one of the first and second protected elements, wherein a requestor sends the request for information related to the first protected element, and said information is returned to the requestor only if the requestor is authorized to access the first protected element.

5. The method as recited in claim 4, further comprising identifying a third element based on information read from the relationship element.

6. The method as recited in claim 5, wherein the third element is a physical object.

7. The method as recited in claim 4, wherein the third element is a protected element.

8. The method as recited in claim 4, wherein the relationship element identifies descriptive information about the first protected element, and the method further comprises retrieving the descriptive information about the first protected element based on the information read from the relationship element.

9. The method according to claim 4, wherein at least one of the first and second protected elements is a data block within a data base.

10. The method according to claim 9, wherein said data block is a block of data stored in a relational data base and selected by a relational view.

11. The method according to claim 9, wherein said data block is a data collection in a hierarchical database.

12. The method according to claim 4, wherein at least one of the first and second protected elements is a structure defined by a query.

13. The method according to claim 4, wherein at least one of the first and second protected elements is a method in an object-oriented system.

14. The method according to claim 4, wherein at least one of said first and second protected elements is a data block and access to the data block is provided by an object-oriented method.

15. The method according to claim 4, wherein at least one of the first and second protected elements is a computer file in a computer file system.

16. The method as recited in claim 4, further comprising locating the relationship element based on the first index element prior to reading the relationship element.

17. A method of determining a relationship between a first library document and a second library document by using a relationship element, wherein the first and second library documents are related and are associated with first and second index elements, respectively, the method comprising:

reading the relationship element in response to a request for information related to the first library document, wherein the relationship element contains information relating the first and second elements;

identifying the second library document based on information read from the relationship element, wherein the relationship element is in a different library than at least one of the first and second library documents, wherein a requestor sends the request for information related to the first library document, and said information is returned to the requestor only if the requestor is authorized to access the first library document.

18. The method as recited in claim 17, further comprising identifying an element different than the first and second library documents, based on the information read from the relationship element.

19. The method as recited in claim 18, wherein the element is a third library document.

20. The method as recited in claim 17, wherein the relationship element is a library document.

21. The method as recited in claim 17, wherein the relationship element refers to a third library document containing relationship information.

22. The method as recited in claim 17, wherein the relationship element is an entry in a link table.

23. The method as recited in claim 17, wherein the relationship element identifies descriptive information about the first library document, and the method farther comprises retrieving the descriptive information about the first library document based on the information read from the relationship element.

24. The method according to claim 17, wherein at least one of the first and second library documents is a data block within a data base.

25. The method according to claim 24, wherein said data block is a block of data stored in a relational data base and selected by a relational view.

26. The method according to claim 24, wherein said data block is a data collection in a hierarchical database.

27. The method according to claim 17, wherein said first library document is a structure defined by a query.

28. The method according to claim 17, wherein at least one of the first and second library documents is a method in an object-oriented system.

29. The method according to claim 17, wherein at least one of said first and second library documents is a data block and access to the data block is provided by an object-oriented method.

30. The method according to claim 17, wherein at least one of the first and second library documents is a computer file in a computer file system.

31. The method according to claim 17, wherein at least one of the first and second library documents is a binary large object (BLOB).

32. The method as recited in claim 17, further comprising locating the relationship element based on the first index element prior to reading the relationship element.

33. A system for providing relationship information for a first element, comprising:

a protected resource including a data manager and the first element, wherein the first element is a protected element bound to a first index;

a second element which is a protected element bound to a second index;

a relationship resource including a relationship resource manager and a relationship element; and a client which sends a request to the protected resource for information related to a relationship of the first element, wherein in response to the request from said client, said data manager identifies said relationship resource manager based on the request for relationship information and based on the first index and sends a request to said relationship resource, and in response to said request from said data manager said relationship resource manager locates the requested relationship element and retrieves the requested relationship information for the protected element based on the relationship element, wherein the relationship information identifies the second protected element bound to a second index;

wherein said protected resource and said relationship resource are in a distributed arrangement, wherein the relationship information is returned to the client only if the client is authorized to access the first element.

34. The system according to claim 33, further comprising a third element related to the first element, wherein the relationship information identifies the third element.

35. A computer program product including a computer-readable medium comprising:

a computer-readable protected resource program code including a data manager and a first element which is a protected element bound to a first index;

a computer-readable relationship resource program code including a relationship resource manager and a relationship element; and a computer-readable client program code for sending a request to the protected resource program code for information related to the first element, wherein, in response to the request from said client program code said data manager identifies said protecting resource manager based on the request for relationship information and based on the first index and sends a request to said relationship resource program code, and in response to said request from said data manager said relationship resource manager locates the requested relationship information for the first element based on the relationship element, wherein the relationship information identifies a second element which is a protected element bound to a second index, and wherein said protected resource program code and said relationship resource program code are to be installed on computing devices arranged in a distributed manner, wherein the relationship information is returned to the computer-readable client program code only if the computer-readable client program code is authorized to access the first element.

36. A method of creating a relationship element, comprising:

searching for a resource containing a first element having a reference to a second element; and automatically building a relationship element linking the first and second elements in response to finding the first element, wherein the first and second elements are protected elements bound to first and second indicies, respectively, and at least one of the first and second elements is in a different data collection than said relationship element.

37. The method as recited in claim 36, wherein the resource is connected to the World-Wide Web (WWW), the first element is an on-line document on the WWW and the reference in the first element is a citation link string identifying the second element as an on-line document on the WWW.

38. The method as recited in claim 36, wherein the relationship element is a link table in a digital library, said building being performed by recording in a row of the link table an identifier for the first element, an identifier for the second element and meta-data for facilitating library services.

* * * * *